United States Patent
Carlough et al.

(10) Patent No.: US 10,303,563 B2
(45) Date of Patent: May 28, 2019

(54) INITIALIZABLE REPAIR CIRCUIT FOR SELECTIVELY REPLACING A TABLE-DRIVEN OUTPUT

(71) Applicant: INTERNATIONAL BUSINESS MACHINES CORPORATION, Armonk, NY (US)

(72) Inventors: Steven R. Carlough, Poughkeepsie, NY (US); Silvia M. Mueller, Boeblingen (DE); Manuela Niekisch, Boeblingen (DE); Kerstin Schelm, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 15/264,755

(22) Filed: Sep. 14, 2016

(65) Prior Publication Data

US 2018/0074918 A1 Mar. 15, 2018

(51) Int. Cl.
*G06F 11/00* (2006.01)
*G06F 11/14* (2006.01)
(Continued)

(52) U.S. Cl.
CPC .......... *G06F 11/1471* (2013.01); *G06F 11/14* (2013.01); *G06F 11/1658* (2013.01);
(Continued)

(58) Field of Classification Search
CPC ......... G06F 2207/5354; G06F 11/1471; G06F 2201/805; G06F 2201/82; G06F 11/1658;
(Continued)

(56) References Cited

U.S. PATENT DOCUMENTS

| 4,992,968 A * | 2/1991 | Adiletta | G06F 7/535 708/650 |
| 5,729,486 A * | 3/1998 | Okada | G06F 1/035 708/653 |

(Continued)

FOREIGN PATENT DOCUMENTS

JP        5663261 B2      4/2015

*Primary Examiner* — Albert Decady
*Assistant Examiner* — Osman M Alshack
(74) *Attorney, Agent, or Firm* — Steven Chiu, Esq.; Kevin P. Radigan, Esq.; Heslin Rothenberg Farley & Mesiti P.C.

(57) ABSTRACT

An initializable repair circuit and method are provided to facilitate, when enabled, selective replacement of a table-driven output value provided by a lookup structure. The initializable repair circuit includes a compare circuit to identify a cell of the lookup structure based, at least in part, on a first input value and a second input value. The table-driven output value is ascertained, at least in part, using a cell value of the identified cell. The initializable repair circuit further includes a repair enable register and a logic circuit. The repair enable register contains an enable repair indicator to be set when at least one cell value is known to be incorrect, and the logic circuit replaces the incorrect table-driven output value provided by the lookup structure with an initialized replacement value based, at least in part, on the enable repair indicator being set in the repair enable register.

20 Claims, 8 Drawing Sheets

(51) Int. Cl.
    *G06F 11/16*     (2006.01)
    *H04L 29/12*     (2006.01)
(52) U.S. Cl.
    CPC .... *G06F 2201/805* (2013.01); *G06F 2201/82* (2013.01); *G06F 2207/5354* (2013.01); *H04L 29/12132* (2013.01)
(58) Field of Classification Search
    CPC ............ H04L 29/12132; G11C 29/783; G11C 29/886
    USPC ........................................ 714/710, 747, 759
    See application file for complete search history.

(56) References Cited

U.S. PATENT DOCUMENTS

| | | | | |
|---|---|---|---|---|
| 5,777,917 | A * | 7/1998 | Chung | G06F 7/535 |
| | | | | 708/653 |
| 6,134,143 | A * | 10/2000 | Norman | G11C 16/06 |
| | | | | 365/185.07 |
| 8,839,054 | B2 | 9/2014 | Braceras et al. | |
| 8,860,460 | B1 * | 10/2014 | Cashman | H03K 19/17764 |
| | | | | 326/41 |
| 8,914,431 | B2 | 12/2014 | Carlough et al. | |
| 2011/0231468 | A1 * | 9/2011 | Amin | G06F 7/5375 |
| | | | | 708/620 |
| 2013/0173683 | A1 * | 7/2013 | Carlough | G06F 7/5375 |
| | | | | 708/650 |
| 2014/0351662 | A1 | 11/2014 | Braceras et al. | |
| 2015/0380109 | A1 * | 12/2015 | Jeddeloh | G06F 11/2017 |
| | | | | 714/6.13 |

* cited by examiner

FROM FIG. 2B

| | | | | | | | | | | | | | | | | |
|---|---|---|---|---|---|---|---|---|---|---|---|---|---|---|---|---|
| '1110.011 | 1 | 1 | 1 | 1 | 1 | 1 | 1 | 1 | 1 | 1 | 1 | 1 | 1 | 1 | 1 | |
| '1110.010 | 2 | 2.1 | 1 | 1 | 1 | 1 | 1 | 1 | 1 | 1 | 1 | 1 | 1 | 1 | 1 | |
| '1111.001 | 2 | 2 | 2.1 | 1 | 1 | 1 | 1 | 1 | 1 | 1 | 1 | 1 | 1 | 1 | 1 | |
| '1110.000 | 2 | 2 | 2 | 2 | 2.1 | 1 | 1 | 1 | 1 | 1 | 1 | 1 | 1 | 1 | 1 | |
| '1101.111 | 2 | 2 | 2 | 2 | 2 | 2.1 | 1 | 1 | 1 | 1 | 1 | 1 | 1 | 1 | 1 | |
| '1101.110 | 2 | 2 | 2 | 2 | 2 | 2 | 2.1 | 2.1 | 1 | 1 | 1 | 1 | 1 | 1 | 1 | |
| '1101.101 | 2 | 2 | 2 | 2 | 2 | 2 | 2 | 2.1 | 2.1 | 1 | 1 | 1 | 1 | 1 | 1 | |
| '1101.100 | 2 | 2 | 2 | 2 | 2 | 2 | 2 | 2 | 2.1 | 2.1 | 2.1 | 1 | 1 | 1 | 1 | |
| '1101.011 | 2 | 2 | 2 | 2 | 2 | 2 | 2 | 2 | 2 | 2 | 2.1 | 2.1 | 1 | 1 | 1 | 280 |
| '1101.010 | 2 | 2 | 2 | 2 | 2 | 2 | 2 | 2 | 2 | 2 | 2.1 | 2.1 | 2.1 | 1 | 1 | -4/3 |
| '1101.001 | 2 | 2 | 2 | 2 | 2 | 2 | 2 | 2 | 2 | 2 | 2 | 2.1 | 2.1 | 2.1 | 1 | |
| '1101.000 | 2 | 2 | 2 | 2 | 2 | 2 | 2 | 2 | 2 | 2 | 2 | 2 | 2.1 | 2.1 | 2.1 | |
| '1100.111 | 2.1.0 | 2 | 2 | 2 | 2 | 2 | 2 | 2 | 2 | 2 | 2 | 2 | 2 | 2.1 | 2.1 | $X_3$ |
| '1100.110 | 2.1.0 | 2.1.0 | 2 | 2 | 2 | 2 | 2 | 2 | 2 | 2 | 2 | 2 | 2 | 2 | 2 | |
| '1100.101 | 2.1.0 | 2.1.0 | 2 | 2 | 2 | 2 | 2 | 2 | 2 | 2 | 2 | 2 | 2 | 2 | 2 | 290 |
| '1100.100 | 2.1.0 | 2.1.0 | 2.1.0 | 2 | 2 | 2 | 2 | 2 | 2 | 2 | 2 | 2 | 2 | 2 | 2 | -5/3 |
| '1100.011 | 2.1.0 | 2.1.0 | 2.1.0 | 2.1.0 | 2 | 2 | 2 | 2 | 2 | 2 | 2 | 2 | 2 | 2 | 2 | |
| '1100.010 | 2.1.0 | 2.1.0 | 2.1.0 | 2.1.0 | 2.1.0 | 2 | 2 | 2 | 2 | 2 | 2 | 2 | 2 | 2 | 2 | |
| '1100.001 | 2.1.0 | 2.1.0 | 2.1.0 | 2.1.0 | 2.1.0 | 2 | 2 | 2 | 2 | 2 | 2 | 2 | 2 | 2 | 2 | |
| '1100.000 | 2.1.0 | 2.1.0 | 2.1.0 | 2.1.0 | 2.1.0 | 2.1.0 | 2 | 2 | 2 | 2 | 2 | 2 | 2 | 2 | 2 | |
| '1100.111 | 2.1.0 | 2.1.0 | 2.1.0 | 2.1.0 | 2.1.0 | 2.1.0 | 2.1.0 | 2 | 2 | 2 | 2 | 2 | 2 | 2 | 2 | |
| '1011.110 | 2.1.0 | 2.1.0 | 2.1.0 | 2.1.0 | 2.1.0 | 2.1.0 | 2.1.0 | 2 | 2 | 2 | 2 | 2 | 2 | 2 | 2 | |
| '1011.101 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | 1 | |
| '1011.100 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | 2 | |
| '1011.011 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.010 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.001 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | 2 | |
| '1011.000 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | 2 | |
| '1010.111 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | 2 | |
| '1010.110 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | 2 | |
| '1010.101 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | 2 | |
| '1010.100 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2 | |
| '1010.011 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | 2.1.0 | -8/3 |

INITIALIZABLE REPAIR CIRCUIT FOR SELECTIVELY REPLACING A TABLE-DRIVEN OUTPUT

BACKGROUND

Division, reciprocal, square root, approximations, and other arithmetic operations are often used in critical applications that impact the performance of a data processing unit. This is especially true of integer divisions which are relevant in, for instance, the JAVA, C++ and Oracle programming languages. Integer division is typically used for fast hashing in many current software routines.

A predominant and fast divide algorithm currently available is SRT based division (named for its creators, Sweeney, Robertson and Tocher). SRT division, which is a popular method for division in many microprocessor implementations, is similar to non-resorting division, but SRT division uses a lookup table based on the dividend and the divisor to determine each quotient digit. The size and the values within the lookup table may depend upon the cycle time and the implementation.

Any error within the lookup table will lead to an incorrect result. Exhaustive simulation that guarantees the correctness of such a lookup table is not always possible.

SUMMARY

The shortcomings of the prior art are overcome, and additional advantages are provided through the provision, in one aspect, of a system which includes an initializable repair circuit to facilitate, when enabled, selective replacement of a table-driven output value provided by a lookup structure. The initializable repair circuit includes: a compare circuit to identify a cell of the lookup structure based, at least in part, on a first input value and a second input value, the table-driven output value being ascertained, at least in part, using a cell value of the identified cell; a repair enable register, the repair enable register containing an enable repair indicator to be set when the cell value in the identified cell is known incorrect; and a logic circuit to replace the table-driven output value provided by the lookup structure with an initialized replacement value based, at least in part, on the enable repair indicator being set in the repair enable register.

In another aspect, a system is provided which includes a lookup structure and an initializable repair circuit. The lookup structure provides table-driven output values ascertained from, at least in part, cell values of the lookup structure. The initializable repair circuit, which facilitates, when enabled, selective replacement of a table-driven output value provided by the lookup structure, includes: a compare circuit to identify a cell of the lookup structure based, at least in part, on a first input value and a second input value, the table-driven output value being ascertained, at least in part, using a cell value of the identified cell; a repair enable register, the repair enable register containing an enable repair indicator to be set when the cell value of the identified cell is known incorrect; and a logic circuit to replace the table-driven output value provided by the lookup structure with an initialized replacement value based, at least in part, on the enable repair indicator being set in the repair enable register.

In a further aspect, a method is provided which includes providing an initializable repair circuit to facilitate, when enabled, selective replacement of a table-driven output value provided by a lookup structure. The providing of the initializable repair circuit includes: providing a compare circuit to identify a cell of the lookup structure based, at least in part, on a first input value and a second input value, the table-driven output value being ascertained, at least in part, using a cell value of the identified cell; providing a repair enable register, the repair enable register containing an enable repair indicator to be set when the cell value in the identified cell is known incorrect; and providing a logic circuit to replace the table-driven output value provided by the lookup structure with an initialized replacement value based, at least in part, on the enable repair indicator being set in the repair enable register.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Disclosed herein are systems and methods for providing an adjustable or initializable repair circuit or mechanism to facilitate selective replacement or overwriting of a table-driven output value provided by a lookup structure. By way of example, the initializable repair circuit is described below in combination with a range-check-based lookup table mechanism for use in a data processing system. In one or more embodiments, the range-check-based lookup table mechanism may be used with SRT mechanisms or algorithms. In one or more embodiments, a range-check-based lookup table mechanism allows for a smaller lookup table size to be used for quotient digital guesses in the SRT mechanism. Note, however, that the initializable repair mechanism described herein may be employed with any arithmetic unit configured to compute a mathematical function in an iterative manner, using in each iteration a new table-driven output value to compute a next partial result.

As indicated, a fault within a hard-coded table structure will lead to an incorrect table-driven output value. Unfortunately, due to the size of lookup structures today, an exhaustive simulation would not necessarily guarantee correctness of the table. One fix would be to rebuild the circuit, and replace the existing hard-coded table structure with a correct table structure. However, such a solution is typically expensive and time-consuming. Another possible solution would be to bypass the hardware circuit and execute the effected instruction, for instance, a divide operation, in software. However, using a software workaround would have a significant negative impact on performance, which is also typically not acceptable.

Before describing the initializable repair circuit and operation of the repair mechanism further, a range-check-based lookup table implementation is initially described below with reference to FIGS. 1-5. Note that this is one implementation only of a lookup structure with which an initializable repair circuit or mechanism such as described herein may be associated for subsequent use in operation.

The speed of any given division operation is bounded by two factors: the number of iterations necessary to complete the operation, and how long each iteration takes to complete. Multiplication based algorithms for performing division operations, such as Newton-Raphson or Goldschmidt-Powers algorithms, converge to a solution with relatively fewer operations. However, each iteration requires significantly more computation than a simple addition implementation would. In high frequency processors, more than 1 clock cycle is often required per iteration.

Addition based algorithms for performing division operations, such as SRT, require more iterations to complete than multiplicative algorithms, but each iteration is typically completed in 1 cycle. Depending on the frequency of the processor clock in which the algorithm is implemented, it is often possible to compute more than one quotient digit per processor cycle. The lower the clock frequency of the processor, the longer each iteration takes to complete but the easier it is to compute more bits of the result per processor cycle. For example, known algorithms such as SRT radix-4 computes 2 bits of the results per processor cycle. Radix-16 SRT algorithms compute 4 bits per processor cycle but require large lookup tables and are typically difficult to fit into a faster processor cycle time.

Addition-based mechanisms, such as SRT, require a lookup table (LUT) to determine quotient digits. Depending on the actual implementation, the size of the LUT is determined by several different parameters and higher radix mechanisms cause the LUT to become very large. Furthermore, the size of the LUT has an impact on the timing and thus, limits the speed of the processor and may be prone to implementation errors.

The illustrative embodiments take advantage of the mathematical properties of the LUT in order to provide the same result as a fully filled LUT with direct access but using a smaller size LUT than that of the fully filled LUT. This is done by storing only the portions of the LUT corresponding to range boundaries. This enables faster circuit logic due to shorter paths. Furthermore, the illustrative embodiments allow for a natural separation of the initialization processor cycle, in which the smaller sized LUT is addressed once based on the divisor of the division (also referred to as the preprocessing step) and a lookup processor cycle (also referred to as the iteration step), in which the previously stored range boundaries are compared to the input value, replacing the actual large table lookup as known in state of the art solutions. Compared to these known solutions where this input value is used together with the divisor of the division to address the huge LUT at each iteration step, the moving of some of the computing related to the LUT outside of the iteration step into the preprocessing step, allows a reduction of the amount of circuit logic necessary in the iteration step to implement the SRT algorithm.

The illustrative embodiments will be described hereafter with regard to their use with the SRT division algorithm and circuit logic. It should be appreciated, however, that the mechanisms of the illustrative embodiments are not limited to such. Rather, the lookup table (LUT) mechanisms of the illustrative embodiments may be used with any mechanism in which a LUT having sorted data organization is utilized, as may the repair mechanism disclosed herein.

The SRT division algorithm is an iterative algorithm similar to non-resorting division. The SRT division algorithm is a well-known algorithm and thus, a more detailed description is not presented herein except to the level necessary to understand certain improvements made by the present invention to the LUT mechanism used with the SRT division algorithm. The SRT division algorithm is described in various published documents.

Implementations of the SRT division algorithm utilize a LUT mechanism which, based on the dividend and the divisor, is used to determine the quotient digit. The iteration SRT function for calculating the partial remainder is:

$$P(i+1)=r*P(i)-q(i+1)*D$$

where i is the iteration step, r is the radix (usually 2, 4, 8, 10 or 16), P(i) is the partial remainder, D is the denominator, and q(i+1) is the guessed quotient (note that the quotient digit q(i+1)=LUT{P(i), D}). The iteration SRT function essentially computes the next partial remainder P(i+1) based on a quotient guess q(i+1) and the current partial remainder P(i).

Figure 1:
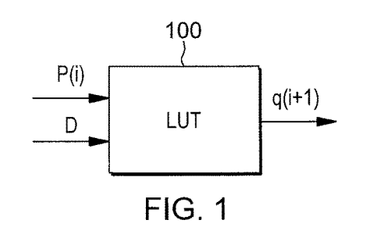
FIG. 1 is an example that illustrates the use of a LUT to generate a guessed quotient q(i+1), and which may require replacement or overwriting, in accordance with one or more aspects of the present invention.

FIG. 1 illustrates the use of a LUT 100 to generate a guessed quotient q(i+1). As shown in FIG. 1, a partial remainder P(i) and the constant denominator D are input to the LUT 100 to perform a lookup operation that outputs a guessed quotient q(i+1). Thus, the LUT 100 is also often referred to as a PD-table or PD-plot. The guessed quotient q(i+1) is input to further circuit elements that are used to implement the SRT algorithm mechanism, e.g., an input register to an adder circuit that adds the partial remainder and the product of the quotient guess and the constant denominator, or divisor, D.

The size of the LUT 100 equals the amount of subdivisions in the partial remainder P(i) and the denominator D. For example, for a LUT with radix r=4, P with 128 sub-divisions, and D with 16 sub-divisions, if the quotient guesses are integers within the set $\{-2, -1, 0, 1, 2\}$, and the q(i+1) values are coded using 3 bits, the size of the LUT is then 16*128*3=6144 bits. Thus, the LUT 100 may represent a significant size in an integrated circuit design taking up a relatively large amount of chip area and consuming a relatively large amount of power in operation.

Figure 2A:
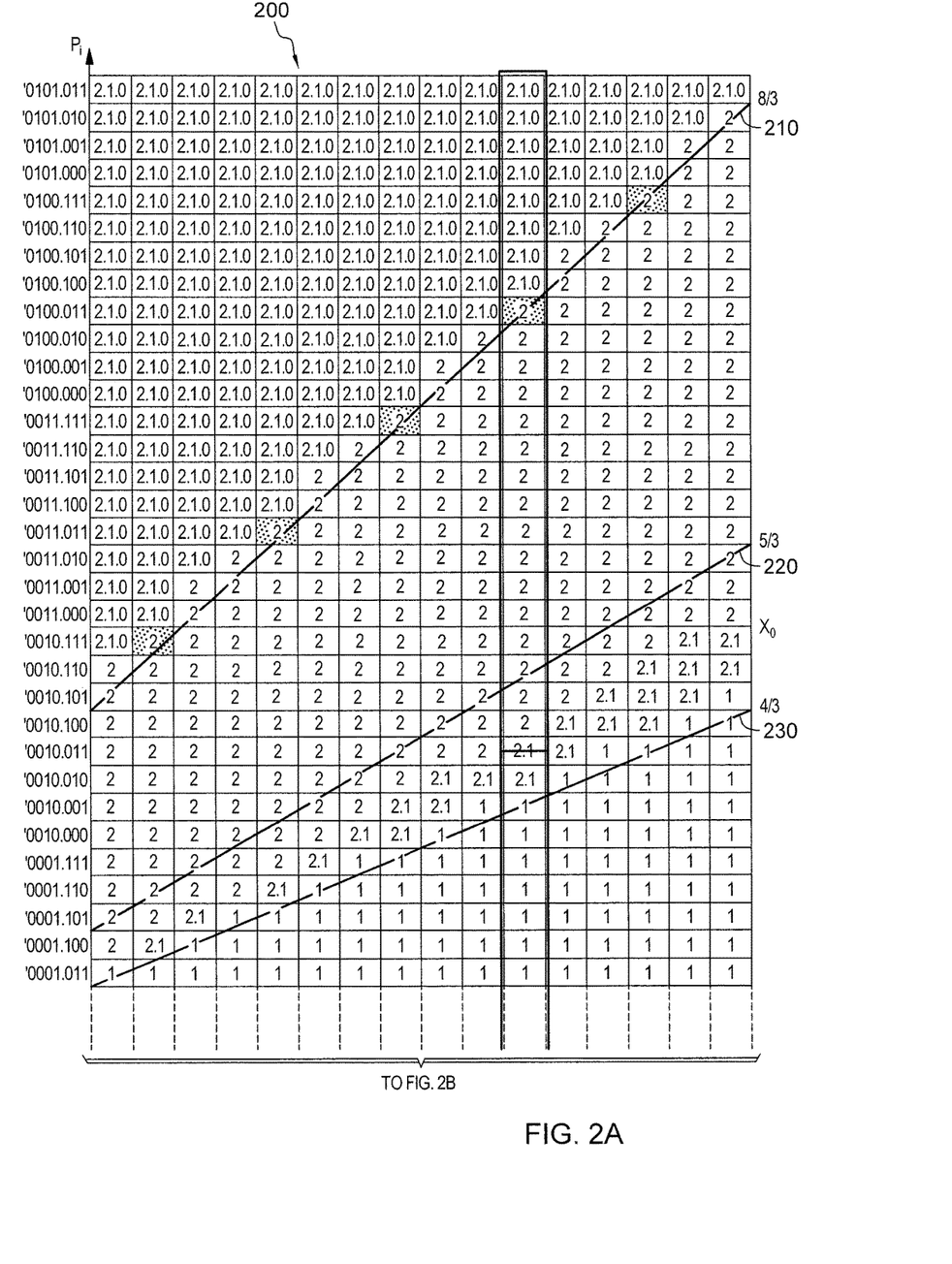
FIGS. 2A-2C illustrate an example diagram of a lookup table for outputting a quotient guess for an SRT division operation, which may require replacement, in accordance with one or more aspects of the present invention.
Figure 2B:
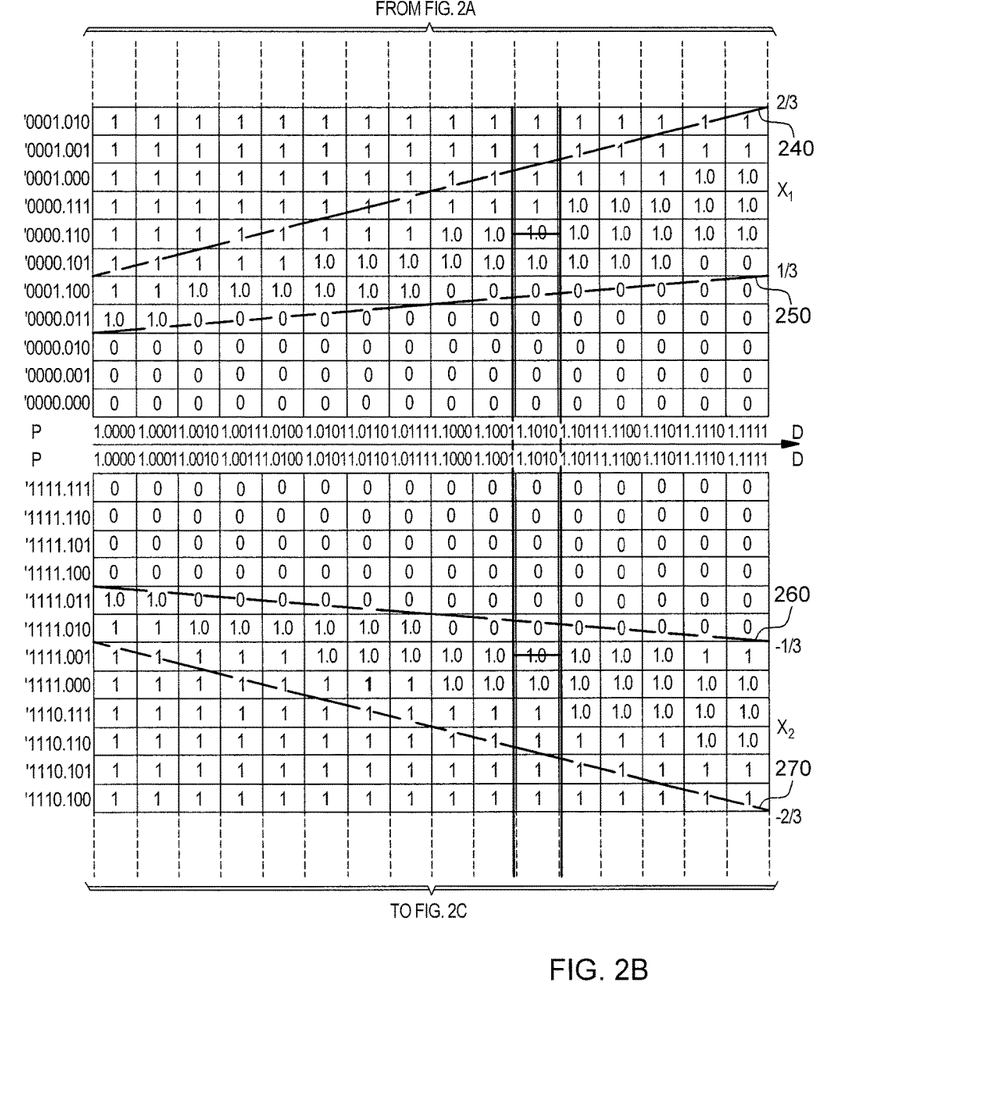
Figure 2C:
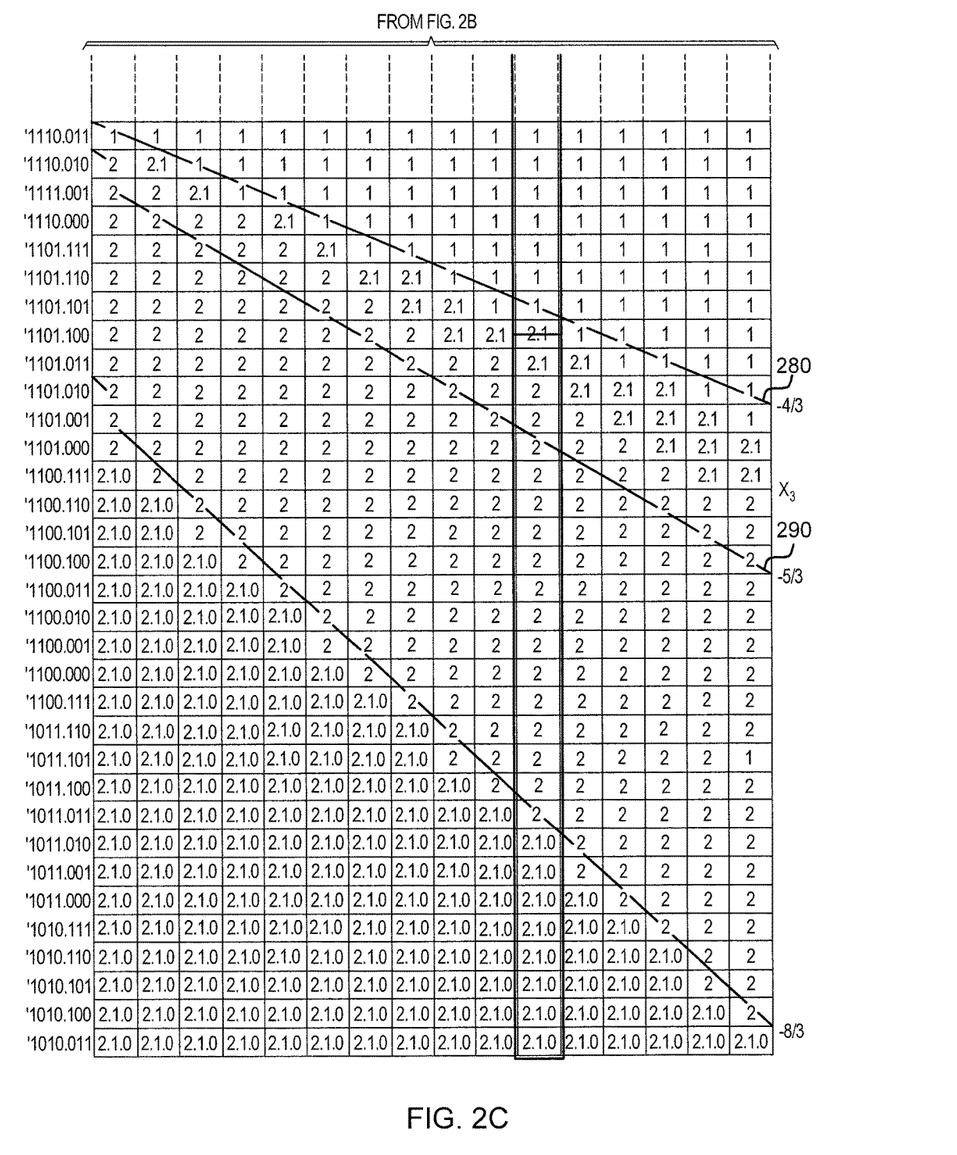

FIGS. 2A-2C illustrate an example diagram of a lookup table that may be implemented by the LUT mechanism 100 of FIG. 1, for example. As shown in FIGS. 2A-2C, each row of the SRT lookup table 200 corresponds to a different partial remainder P, while each column of the SRT lookup table 200 corresponds to a different denominator D. At each cell of the SRT lookup table 200 for a particular P, D pair, a corresponding quotient value is stored, e.g., 0, 1, 2, etc. Thus, for example, a cell value of "0" means that for that particular P(i) and D, the output is a quotient guess q(i+1) of 0. For a cell whose value is "1.0" the particular P(i) and D results in a quotient guess q(i+1) of either 1 or 0. It does not matter which of 0 or 1 is chosen, as long as both 1 and 0 are acceptable for the algorithm (e.g., as long as the convergence criteria of the SRT algorithm is respected).

As can be seen from FIGS. 2A-2C, there is a definite pattern of values denoted by the areas between the dark border lines 210-250. These borders 210-250 represent a set of cells and corresponding P, D values where the set of quotient values below this border is at most one quotient value, e.g., line 230 below which the quotient values are at most 1, or where the set of quotient values above this border is at least one quotient value, e.g., line 240 where the quotient values are at least 1. Thus, for a particular D value addressing a column in the SRT lookup table 200, there are P values at which the adjacent P values have different quotient guess q(i+1) values. For example, for a D value of 1.1110, the partial remainder P(i)=0000.100 has a quotient guess of 0 and P(i)=0000.110 has a quotient guess of 1,0 (it should be noted that i in the context of P(i) is an index related to the iteration step, not to the value P and thus, P(i+1) is the value of P at the iteration (i+1)). Thus, in the SRT lookup table 200, for each column corresponding to each D value, there are 4 border P values, 2 on the positive P side and 2 on the −P side. The borders are chosen between the highest and the lowest values of P for which a given q(i+1)=k is set.

It is further noted that for all iterations of the SRT mechanism, the D value is kept constant, i.e. D is the normalized divisor of the SRT division. Looking again at the SRT function for calculating the partial remainder set forth above, it is shown that the D value remains constant even though the iteration value i may change as does the P(i) and q(i+1) values. Since D remains constant for all iterations, the quotient guesses q(i+1) are all taken from the same column of the SRT lookup table 200. Furthermore, the SRT lookup table 200 has the properties that for a given D value:

if $P1(i) >= P2(i)$, then $q1(i) >= q2(i)$ if $P1(i) <= P2(i)$, then $q1(i) <= q2(i)$ where i is the iteration value and the indices 1 and 2 are any two possible values for P(i). In other words, if a first border P value, i.e., P1(i), is greater to or equal to a second border P value, i.e., P2(i), then their quotient guess values q1(i) and q2(i), respectively, are likewise related such that q1(i) is greater than or equal to the q2(i) value.

Because of these properties, it can be seen that it is not necessary to store all of the values of the SRT lookup table 200 in memory but that it suffices to store only the boundary values of P for which the adjacent q(i+1) changes. Thus, it is possible to compare the input value of P(i) to the stored boundary P values of the SRT lookup table 200 to determine which quotient value to select.

In the depicted example, 4 values of P, with 7 bits each, may be stored for each of the 16 columns of the SRT lookup table 200 in order to denote the boundary P values. There are 4 range boundary values because, in the depicted example, the digit set includes 5 possible values for the q(i+1) digits, i.e. {−2, −1, 0, 1, 2,}. This gives a size of the new lookup table (LUT) of Size=4 values*7 bits*16 columns=448 bits. This is a reduction factor of 13.7, i.e. the new LUT has a size that is only 7.3% of the size of the original fully filled LUT. After compression of this new LUT, the new LUT can be reduced to approximately 62 entries which is a reduction factor of 99, i.e. the new compressed LUT has a size that is only 1% of the size of the original fully filled LUT.

The illustrative embodiments provide a mechanism for utilizing the new LUT or new compressed LUT in which only the range border cells for each column of the LUT are stored, to perform a lookup of an output value. With one illustrative embodiment, the new LUT or new compressed LUT is used to output a quotient guess q(i+1) based on the input of current partial remainder P(i) and a constant denominator or divisor D. The lookup operation is made more efficient than known lookup operations in that it utilizes a smaller LUT, utilizes less power, and increases the speed of the lookup operation due to the smaller size of the LUT.

Figure 3:
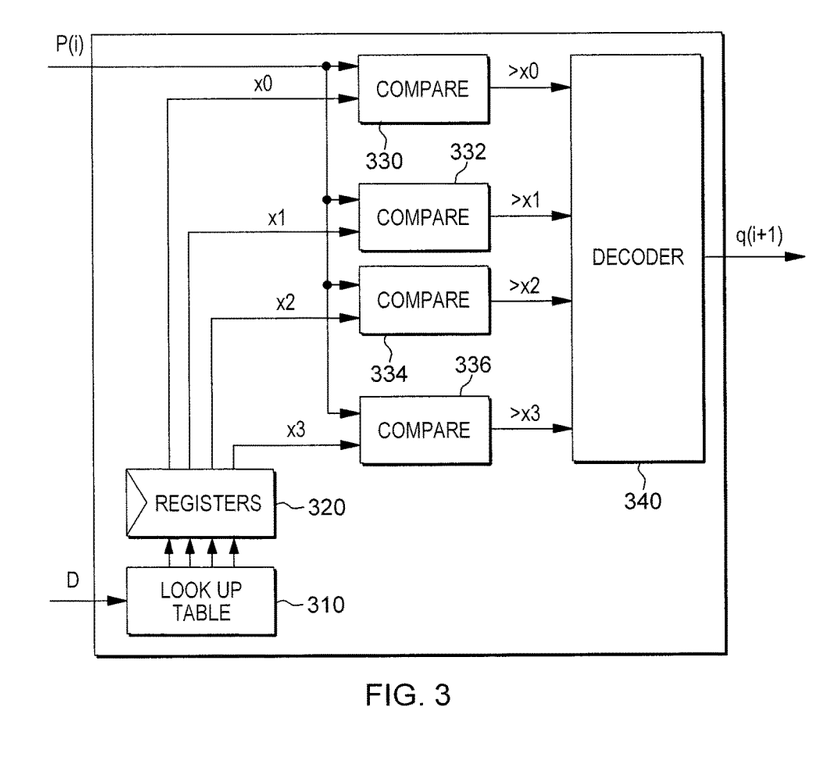
FIG. 3 is an example diagram illustrating one circuit implementation of a lookup table structure, with which a repair circuit may be associated, in accordance with one or more aspects of the present invention.

FIG. 3 is an example diagram illustrating one circuit implantation of a range check-based lookup table mechanism in accordance with one illustrative embodiment. As shown in FIG. 3, the constant divisor or denominator D is input to the new reduced size LUT 310 which only stores the partial remainder values of the border cells for each of the columns of the original fully filled LUT that correspond to the various D values. Thus, with a radix 4 SRT algorithm, the LUT stores the four border cell partial remainder values. As a result of the input of the D value into the LUT 310, the LUT 310 outputs the four border cell partial remainder values x0 to x3 to registers 320, where x0 is a border cell which is chosen between the lines 220 and 230, x1 is a border cell which is chosen between the lines 240 and 250, x2 is a border cell which is chosen between the lines 260 and 270 and x3 is a border cell which is chosen between the lines 280 and 290.

Each of the border cell partial remainder values is input to a corresponding comparator 330-336. Also input to each of the comparators 330-336 is the current partial remainder P(i) for the current iteration of the SRT division algorithm. The comparators 330-336 compare the current partial remainder P(i) to the corresponding border cell partial remainder value x0 to x3 to determine if the current partial remainder P(i) is greater than the border cell partial remainder value x0 to x3. If so, the comparator outputs a value indicative of the current partial remainder P(i) being greater than the corresponding border cell partial remainder value x0, x1, x2 or x3. The result is a vector input to the decoder 340 where the vector input in the depicted example comprises four values, each value indicative of whether or not the partial remainder P(i) is greater than a corresponding border cell partial remainder value x0, x1, x2 or x3.

In the depicted example, it is known that x0>x1>x2>x3. Therefore, it suffices in the decoder 340 to detect in the vector input, for which two consecutive values in the vector, the comparator outputs are [0, 1]. For example, if the value output from comparator 330 is a 0 and the output from comparator 332 is a 1, then it is known that the current partial remainder is not greater than the border cell partial remainder value x0 but is greater than the border cell partial remainder value x1. Thus, the partial remainder P(i) is in the range between x1 and x0.

The decoder 340 determines which range the current partial remainder P(i) is present in based on the various comparisons made by the comparators 330-336 and based on the range that the current partial remainder P(i) is in, a corresponding quotient guess q(i+1) is output by the decoder 340. In one illustrative embodiment, the quotient guess q(i+1) is output by the decoder 340 based on the 4 boundaries and thus, the decoder outputs one of 5 choices for q(i+1), i.e. {2, 1, 0, −1, −2}.

For example, using the example LUT shown in FIGS. 2A-2C, if all of the values output by the comparators 330-336 are 1, then the current partial remainder P(i) is in the upper range of the LUT, i.e. the portion of the LUT where the cells have quotient guess values of 2 or "0,1,2", and thus, the value 2 is output as a quotient guess q(i+1). If all of the outputs from the comparators 330-336 are 0, then the current partial remainder P(i) is at a lowest range of the LUT, i.e., the portion of the LUT where the cells have quotient guess values of 2 or "−2, −1, 0", and thus, the values −2 is output as a quotient guess q(i+1). If comparator 330 outputs a 0 and comparator 332 outputs a 1, then the current partial remainder P(i) is in the range between x0 and x1 in FIGS. 2A-2C and the quotient guess is 1. If the comparator 330 outputs a 0, comparator 332 outputs a 0, and comparator 334 outputs a 1, then the current partial remainder P(i) is in the range between x2 and x1, i.e., the area x1 in FIGS. 2A-2C and the quotient guess q(i+1) that is output is a 0. If the comparator 330 outputs a 0, comparator 332 outputs a 0, comparator 334 outputs a 0, and comparator 336 outputs a 1, then the current partial remainder P(i) is in the range between x2 and x3, i.e. the area x2 in FIGS. 2A-2C, and thus, the quotient guess q(i+1) is a −1 value.

Thus, with the mechanisms of the illustrative embodiments, a smaller LUT is able to be used that stores, for each denominator or divisor value D, the boundary partial remainder P(i) values where the output value from the LUT changes from one value to another, e.g., the quotient guess q(i+1) changes from one value to another. This greatly reduces the size of the LUT when compared to a fully filled LUT that stores all of the output values for all combinations of partial remainder P(i) and denominator/divisor D. The current partial remainder P(i) for the current iteration of the algorithm, e.g., the SRT division algorithm, is compared to these stored boundary partial remainder P(i) values to determine the range of the LUT in which the partial remainder P(i) falls and thus, the corresponding correct output value for the LUT, e.g., the correct quotient guess q(i+1) output value.

Figure 4:
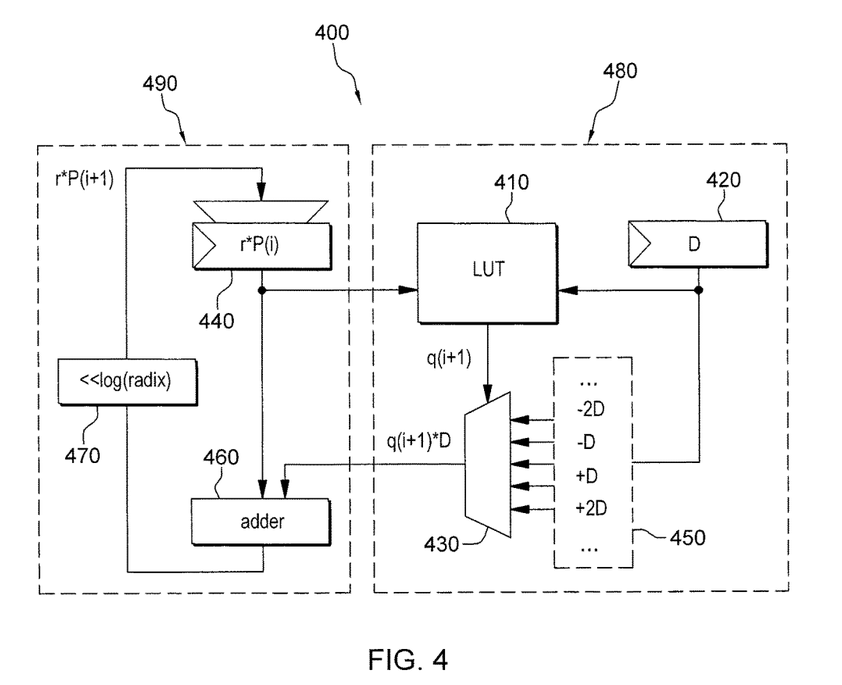
FIG. 4 is an example diagram of a SRT division circuit utilizing, by way of example, a reduced-size LUT structure, with which a repair circuit may be associated, in accordance with one or more aspects of the present invention.

As discussed above, the LUT mechanisms of the illustrative embodiments, such as shown in FIG. 3, for example, may be utilized with circuitry for implementing a SRT algorithm. FIG. 4 is an example diagram of a SRT division circuit utilizing a reduced size LUT mechanism in accordance with one illustrative embodiment.

As shown in FIG. 4, the reduced size LUT 410 is coupled to an input register 420 for receiving the denominator or divisor D. The value of D is set at initialization of the SRT division circuit 400 for performing a SRT division operation. Another input to LUT 410 is partial remainder P(i) register 440 (which is shown with a multiplexer for purposes of initialization before the SRT division operation iteration begins). The output of LUT 410 is connected to multiplexer 430. LUT may be realized as described in FIG. 3 above.

The LUT 410 receives both the D value from register 420 and the partial remainder P(i) for the current iteration from the partial remainder register 440. The LUT 410 outputs a quotient guess q(i+1) to multiplexer 430 as a control input. The quotient guess q(i+1), may be used to select one of the inputs to the multiplexer 430, e.g., −2D, −D, +D, +2D, or 0 (these corresponds to the quotient guess q(i+1)*D in this example). These values may be stored in an input register 450 to the multiplexer 430. Alternatively, rather than using multiplexer 430 and register 450, the output from the LUT 410 may be input to a multiplier that multiplies the output from the LUT 410 with the D value from input register 420.

The resulting output, q(i+1)*D, either from the multiplexer 430, a multiplier (not shown), or the like, is input to an adder circuit 460 along with the partial remainder P(i) for the current iteration. The adder circuit 460 adds the negated product of the quotient guess q(i+1) and the divisor D to the partial remainder P(i) and outputs the results multiplied by the radix r, i.e. shifted from left by log(r). Shifter 470 performs the multiplication with r by shifting left by log(r). While shifter 470 is shown as being after latch 440, in other illustrative embodiments, the shifter 470 may be placed elsewhere in the circuit, such as before latch 440. The shifter 470, in one illustrative embodiment, is a constant shift logic element, i.e. no logic gates involved but instead uses a hardwired bit mapping, although in other illustrative embodiments, logic gates may be utilized.

The example SRT division mechanism shown in FIG. 4 iteratively computes a final remainder, but the primary output is the quotient digits guessed from the LUT 410 at each iteration. Each SRT iteration basically computes P(i+1)=r*P(i)−q(i+1)*D. Hence LUT 410 guesses q(i+1) based on P(i) and D. The multiplexer 430 selects q(i+1)*D, which is based on shifted versions of D from register 450. Adder 460 computes r*P(i)−q(i+1)*D. Shifter 470 performs the multiplication with r by shifting left of log(r).

Figure 5:
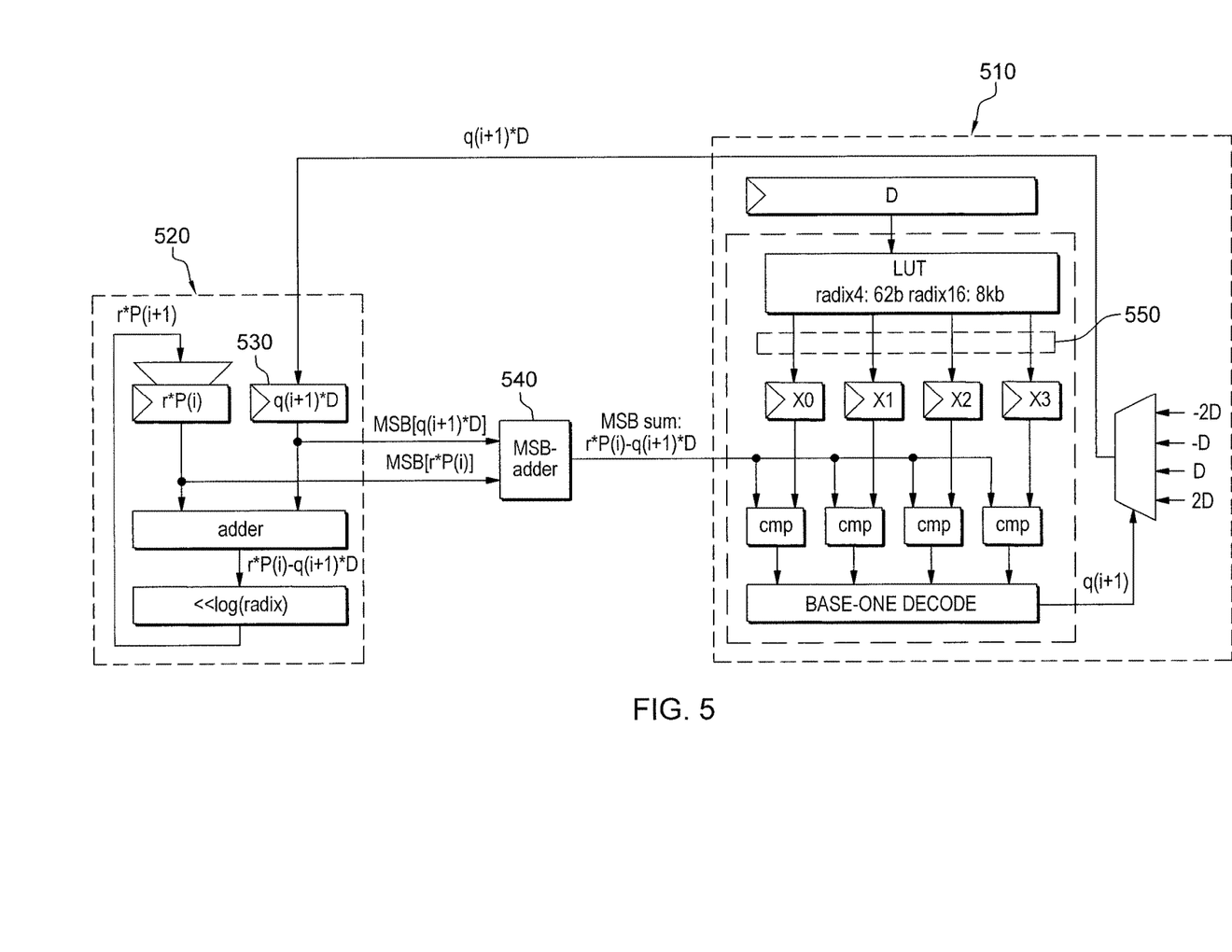
FIG. 5 is an example diagram of a SRT division circuit with range check utilizing a most significant bits (MSB) adder and a reduced-size LUT structure, and which includes an initializable repair circuit, in accordance with one or more aspects of the present invention.

FIG. 5 is an example diagram of a SRT division circuit utilizing a most significant bits (MSB) adder and the reduced size LUT mechanism in accordance with one illustrative embodiment. As shown in FIG. 5, portion 510 of the circuit computes a same result as portion 480 in FIG. 4 and portion 520 in FIG. 5 computes a same results as portion 490 of FIG. 4, however the registers in these portions of FIG. 5 do not have the same values as those of FIG. 4. A primary difference between FIG. 5 and FIG. 4 is the use of the register 530 for storing the product of the quotient guess q(i+1) and the divisor D, and the use of the most significant bits (MSB) adder circuit 540 which takes the most significant bits of the input registers 420 and 440 as input and outputs a MSB sum of r*P(i)−q(i+1)*D. The output from the MSB adder circuit 540 is input to the comparators of the LUT mechanism in portion 510 for comparison with the outputs from the LUT.

As noted, provided herein in one or more aspects, is an initializable or programmable repair circuit for selectively replacing the output from a lookup structure, such as the above-described LUT. In one or more implementations, this initializable repair circuit 550 may reside, at least in part, at or near the output of the LUT.

As discussed above, when a fault or error occurs within a hard-coded lookup structure, an incorrect table-driven output value may be obtained. To address this issue, a programmable repair circuit or mechanism is provided herein in association with the lookup structure (or more generally, an arithmetic unit, or compute engine containing the lookup structure) to selectively replace a table-driven output value of the lookup structure derived, at least in part, from a cell value in the lookup structure identified as faulty or incorrect.

Those skilled in the art will note from the implementation description provided herein that the repair mechanism disclosed may be used (by way of example) whenever an operation can be implemented within, or in association with, a lookup structure, and the operation uses entries within one row/column during execution of a given instance. In this case, a wrong entry can be accounted for at initialization of the unit, where the given row/column may be loaded from, for instance, an associated, full lookup table. When in addition, the entries within the row/column are monotonic, then the implementation may be realized as described above in connection with FIGS. 1-5. One or more of the range boundaries used in such an implementation would be incorrect if the full lookup table contains an incorrect value. Advantageously, the repair mechanism disclosed herein allows for a replacement of one or more cell or boundary values (for instance, during an initialization or preprocessing step) in one or more registers. In operational iteration, the replaced values may be used as explained herein, rather than the incorrect table-driven output value from the lookup structure. Advantageously, the repair mechanism or circuit disclosed may be fabricated in association with an arithmetic unit, and subsequently used to repair one or more values in the hard-coded lookup structure associated with the arithmetic unit if an incorrect value(s) is identified, such as after production of the integrated circuit containing the arithmetic unit.

Advantageously, the lookup structure repair approach disclosed herein allows for the use of a faster, hardware implementation of (for instance) a divide operation or algorithm, without requiring expensive rebuild and replacement of the hardware, should an incorrect value occur in, for instance, a hard-coded lookup table. Note also that the initializable repair circuit disclosed herein may be employed with other lookup structure-based operations, including those which can be implemented with a two-staged lookup table, such as a square root operation.

Figure 6:
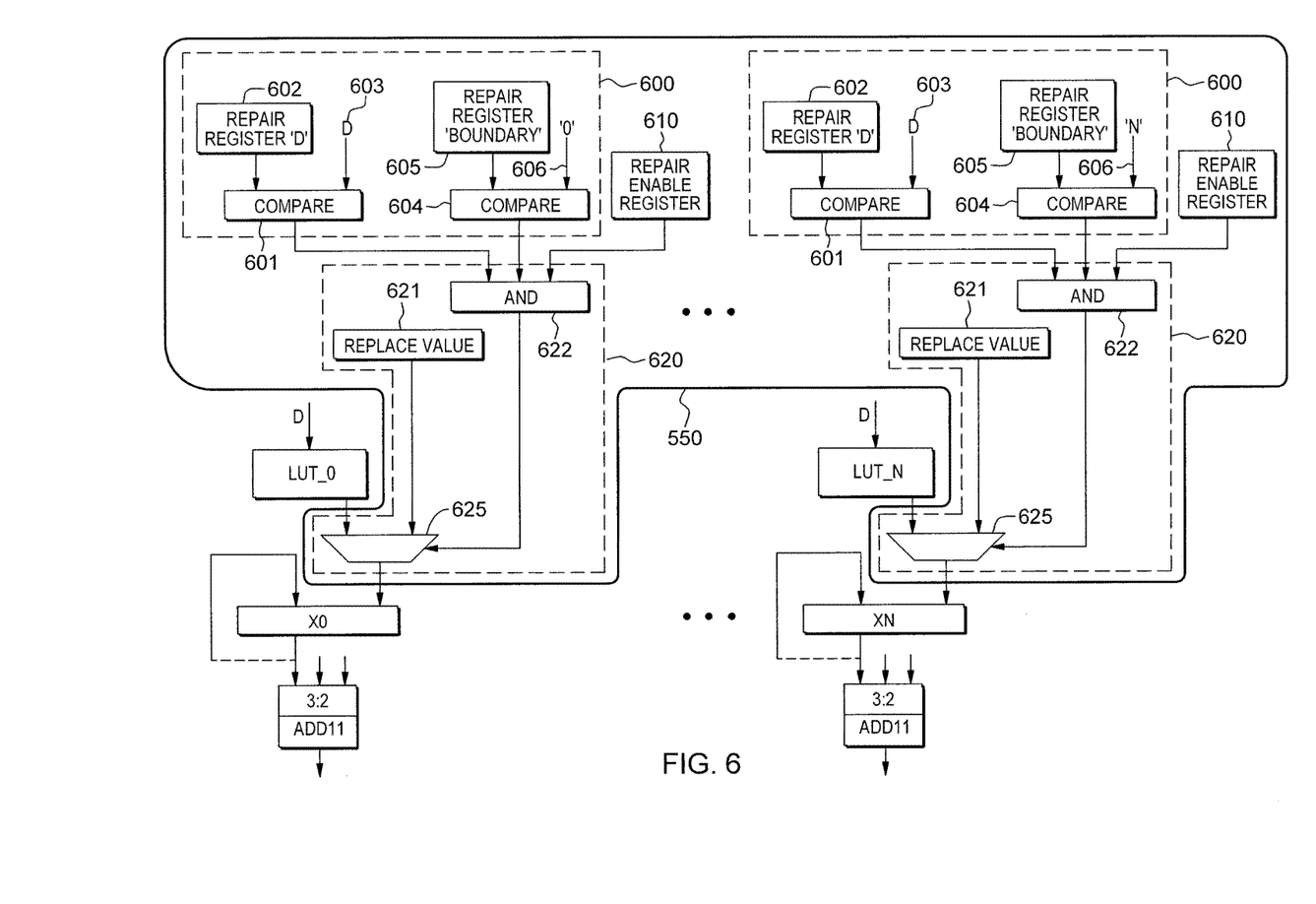
FIG. 6 is an example diagram illustrating one embodiment of an initializable repair circuit associated with an SRT division circuit to facilitate selective replacement of a table-driven output value provided by the lookup structure, in accordance with one or more aspects of the present invention.

FIG. 6 depicts one embodiment of an initializable repair circuit 550, used in association with an SRT division circuit such as depicted in FIG. 5, and described above. Initializable repair circuit 550 facilitates, when enabled, selective replacement of a table-driven output value provided by a lookup structure. In the example provided, the lookup structure stores only boundary cell values from a fully-filled lookup table corresponding to the lookup structure. In this example, N boundary cell values are accounted for by the initializable repair circuit depicted.

As shown, in one or more embodiments, initializable repair circuit 550 may include a compare circuit 600, a repair enable register 610, and a logic circuit 620. Compare circuit 600 facilitates identifying a cell of the lookup structure based, at least in part, on a first input value and a second input value. By way of example, compare circuit 600 may include a set of registers 602, 605, which hold, in one example, an indication of the divisor D, or column, in the lookup structure with a wrong value, and a boundary identification to be replaced from 0 to N boundaries for that divisor D (or column). The first and second inputs may be loaded, in one or more implementations, at initialization of the machine comprising the repair circuit. As noted, after production of the machine, one or more errors in a hard-coded lookup structure may be identified, and once identified, the location of the one or more errors in the lookup structure may be referenced via first and second input compare values loaded in the compare registers 602, 605.

Compare circuit 600 further includes a first comparator 601 to identify a subset of cells of the lookup structure based, at least in part, on the first input value, that is, the value in repair register 'D' 602 in this example addressing a column with a wrong value. First comparator 601 compares the stored or initialized value in register 602 with the divisor D from the current divide operation 603, and when matching, first comparator 601 outputs a matching indicator to a logic circuit 620, such as to an AND gate 622.

In addition, compare circuit 600 may include a second comparator 604 to identify a cell of the lookup structure based, at least in part, on the second input value, which in this case may be a boundary cell to be replaced that is initialized or programmed into the repair register 'boundary' 605. The second comparator 604 determines whether the initialized boundary cell in register 605 matches the boundary 606 to be selected for the current divide operation. Assuming that second comparator identifies a match, then a matching indicator is output from second comparator 604 to logic circuit 620.

Additionally, repair enable register 610 includes an enable repair indicator, which may be set when one or more cell values are known incorrect. As noted, the values within compare registers 602, 605, and repair enable register(s) 610, may be set with initialization of the arithmetic unit or machine with which the initializable repair circuit is associated or employed. For instance, the initializable repair circuit may be programmed to correct a hard-coded lookup structure error that is identified at any time after the machine has been fabricated, such as before shipment, or even after shipment to a customer.

Logic circuit(s) 620 includes, in the example presented, AND gate 622, which receives as inputs the outputs of first comparator 601, second comparator 604, and repair enable register 610. These three inputs to AND gate 622 control whether the multiplexer 625 of logic circuit 620 selects the table-driven output value from the associated lookup structure (e.g., LUT_0 . . . LUT_N), or the initialized or programmed replacement values held in the replace value registers 621 of (or associated with) logic circuit 620. In this manner, the table-driven output values from LUT_0 . . . LUT_N may be replaced or overwritten by the replacement values stored in the replace value registers 621, as controlled by the signal from AND logic 622, with the selected values being stored in the boundary registers X0 . . . XN until the divide operation is finished.

Figure 7:
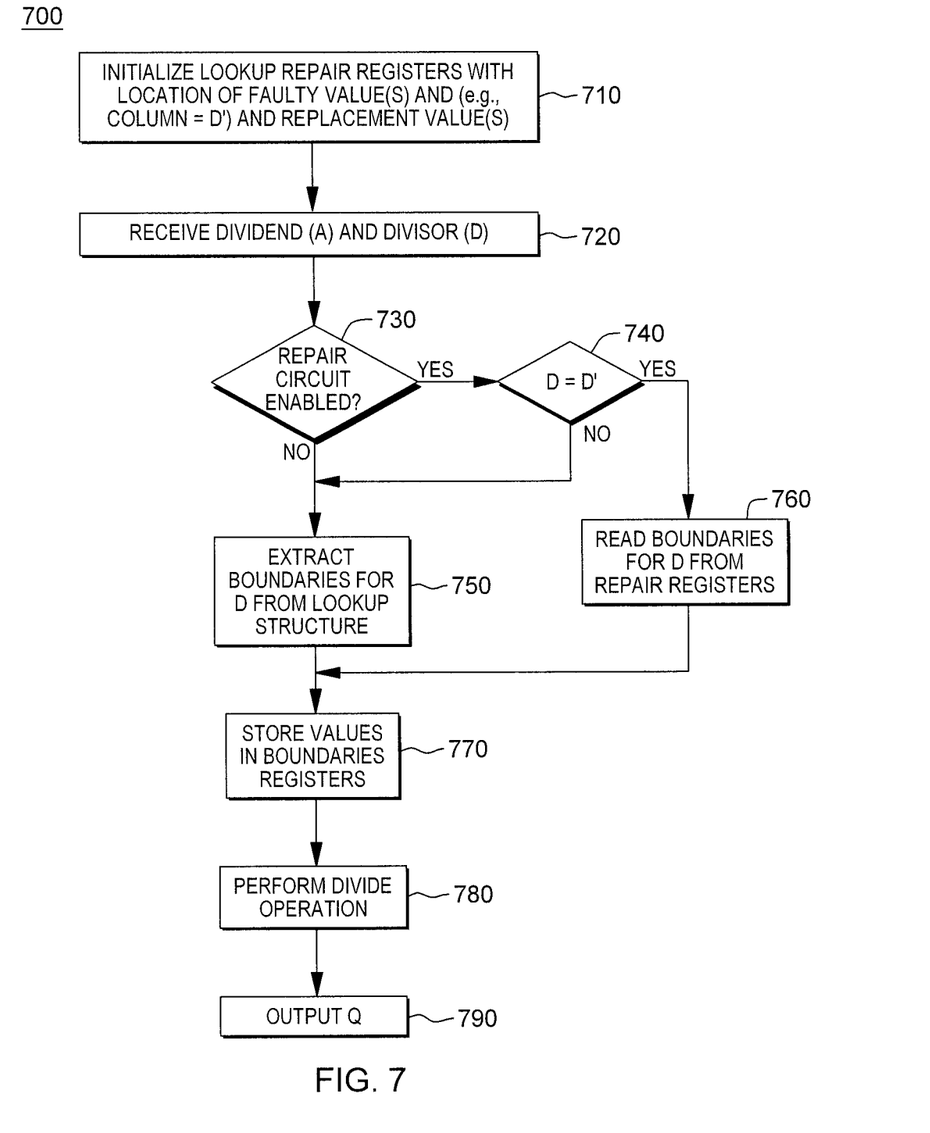
FIG. 7 depicts one embodiment of an operational process of utilizing an initializable repair circuit to selectively replace a table-driven output value provided by a lookup structure, in accordance with one or more aspects of the present invention.

FIG. 7 depicts one embodiment of a process 700 for implementing an operation (such as a divide operation) which incorporates use of a repair circuit, such as described above in connection with FIG. 6. Process 700 includes initializing the lookup repair registers with the location of a faulty value(s) (where, e.g., the faulty column=D', and the row=boundary number or partial remainder, depending on the implementation), as well as the appropriate replacement value(s) 710. During operation, a dividend (A) and divisor (D) are received 720, and processing determines whether the repair circuit is enabled 730. If "yes", then processing determines whether the divisor (D) is the same as the column containing the faulty cell value (D') 740. If "yes", then boundaries from the repair registers 760 may be used. Otherwise, boundaries are extracted for the divisor (D) from the lookup structure 750. The boundary values are stored in the boundary registers 770 (X0 . . . XN in FIG. 6), and the divide operation is performed 780, with the resultant quotient being output 790.

Those skilled in the art will note from the above description that provided herein is an arithmetic unit configured to compute a mathematical function in an iterative manner, using at each iteration a new table-driven value to compute the next partial result. Within or in association with the arithmetic unit, an initializable repair circuit and method are provided, wherein the adjustable repair mechanism may be used to overwrite or replace a table-driven output value going into, for instance, the calculation of a next partial result.

In one or more implementations, the lookup structure providing the table-driven output value may be combinatorial circuit. As noted, the initializable repair circuit may include a set of adjustable or initializable registers which provide the compare and replacement values, as well as first and second address comparators, a repair enable register, and a logic circuit which includes an AND gate and multiplexer to determine whether the table-driven output value (for instance, from LUT) is to be replace by, for instance, a corresponding initialized replace value.

In one or more implementations, the adjustable registers may be registers on a scan chain. Further, as described herein, the arithmetical unit may be an SRT engine, and the initializable repair circuit may be used in combination with a range-check-based SRT table.

Note that the lookup structure disclosed herein does not need to be a ROM, rather, it may be implemented as a collection of gates computing a function, such as synthesized gate groups. The replacement value and compare addresses are in a programmable structure (such as scan-only latches), and not necessarily in a programmable array. The repair circuit may be used in association with any lookup function that has a functional bug hard-coded into a circuit, which was discovered after the device was manufactured, or even after the device was shipped to a customer. The hard-coded function is advantageously modified as described herein by an initial program load of the system, with a few replacement values for the LUT being initialized into appropriate registers. Otherwise, the function of the hard-coded lookup table remains as designed. Advantageously, the repair circuit described herein may be implemented in conventional type of logic, and may be fabricated with, for instance, an arithmetic unit, such as a unit to implement an SRT algorithm.

The terminology used herein is for the purpose of describing particular embodiments only and is not intended to be limiting the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system comprising:
    an initializable hardware repair circuit to facilitate, when enabled, selective replacement of a table-driven output value provided by a hard-coded lookup structure within a computing machine, the initializable hardware repair circuit comprising:
        a compare circuit to identify a cell of the hard-coded lookup structure based, at least in part, on a first input value and a second input value, the table-driven output value being ascertained, at least in part, using a cell value of the identified cell;
        a repair enable register, the repair enable register containing an enable repair indicator set when the cell value in the identified cell of the hard-coded look up structure is known incorrect; and
        a logic circuit to replace the table-driven output value provided by the hard-coded lookup structure with an initialized replacement value based, at least in part, on the enable repair indicator being set in the repair enable register, the initialized replacement value being saved to a repair register with initialization of the initializable hardware repair circuit.

2. The system of claim 1, wherein the initializable hardware repair circuit comprises the repair register to hold the initialized replacement value.

3. The system of claim 1, wherein the compare circuit of the initializable hardware repair circuit comprises:
    a first comparator to identify a subset of cells of the lookup structure based, at least in part, on the first input value; and
    a second comparator to identify the cell of the lookup structure based, at least in part, on the second input value, the cell being selected from the subset of cells of the lookup structure.

4. The system of claim 1, wherein the compare circuit comprises a set of registers to provide compare values to compare the first and second input values against.

5. The system of claim 1, wherein the hard-coded lookup structure is a combinatorial circuit, the combinatorial circuit providing the table-driven output value.

6. The system of claim 1, wherein the hard-coded lookup structure stores only boundary cell values from a fully-filled lookup table corresponding to the hard-coded lookup structure.

7. The system of claim 1, further comprising an arithmetical hardware unit configured to compute a function in an iterative manner, using in each iteration a new table-driven output value to compute a next partial result, the initializable hardware repair circuit being associated with the arithmetical hardware unit.

8. The system of claim 7, wherein the arithmetical hardware unit implements an operation selected from the group consisting of a Sweeney, Robertson and Tocher (SRT) division operation or an SRT square root operation.

9. The system of claim 8, wherein the first input value is a denominator value D that is constant for the SRT division operation or a root value D that is constant for the SRT square root operation, and wherein the second input value is a partial remainder for the current iteration of the operation, and wherein the table-driven output value is a quotient guess value for the SRT division operation.

10. The system of claim 1, further comprising an arithmetical hardware unit configured to compute a function in an iterative manner, using table domain values to set boundary values representing one table column in an initialization step of the computation, the initializable hardware repair circuit being associated with the arithmetical hardware unit.

11. The system of claim 10, wherein the arithmetical hardware unit implements an operation selected from the group consisting of a Sweeney, Robertson and Tocher (SRT) division operation or an SRT square root operation.

12. The system of claim 11, wherein the first input value is a denominator value D that is constant for the SRT division operation or a root value D that is constant for the SRT square root operation, and wherein the second input value is a partial remainder for the current iteration of the operation, and wherein the table-driven output value is a quotient guess value for the SRT division operation.

13. A system comprising:
  A hard-coded lookup structure that provides table drive output values ascertained from, at least in part, cell values of the hard-coded lookup structure within a computing machine; and
  an initializable hardware repair circuit to facilitate, when enabled, selective replacement of a table-driven output value provided by the hard-coded lookup structure, the initializable hardware repair circuit comprising:
    a compare circuit to identify a cell of the hard-coded lookup structure based, at least in part, on a first input value and a second input value, the table-driven output value being ascertained, at least in part, using a cell value of the identified cell;
    a repair enable register, the repair enable register containing an enable repair indicator set when the cell value in the identified cell of the hard-coded lookup structure is known incorrect; and
    a logic circuit to replace the table-driven output value provided by the hard-coded lookup structure with an initialized replacement value based, at least in part, on the enable repair indicator being set in the repair enable register, the initialized replacement value being saved to a repair register with initialization of the initializable hardware repair circuit.

14. The system of claim 13, wherein the initializable harware repair circuit comprises the repair register to hold the initialized replacement value.

15. The system of claim 13, wherein the compare circuit of the initializable hardware repair circuit comprises:
  a first comparator to identify a subset of cells of the lookup structure based, at least in part, on the first input value; and
  a second comparator to identify the cell of the lookup structure based, at least in part, on the second input value, the cell being selected from the subset of cells of the lookup structure.

16. The system of claim 13, wherein the compare circuit comprises a set of registers to provide compare values to compare the first and second input values against.

17. The system of claim 13, wherein the hard-coded lookup structure is a combinatorial circuit, the combinatorial circuit providing the table-driven output value.

18. The system of claim 13, wherein the hard-coded lookup structure stores only boundary cell values from a fully-filled lookup table corresponding to the hard-coded lookup structure.

19. The system of claim 13, further comprising an arithmetical hardware, the initializable hardware repair circuit being associated with the arithmetical hardware unit.

20. A method comprising:
  providing an initializable hardware repair circuit to facilitate, when enabled, selective replacement of a table-driven output value provided by a hard-coded lookup structure within a computing machine, the providing of the initializable hardware repair circuit including:
    providing a compare circuit to identify a cell of the hard-coded lookup structure based, at least in part, on a first input value and a second input value, the table-driven output value being ascertained, at least in part, using a cell value of the identified cell;
    providing a repair enable register, the repair enable register containing an enable repair indicator set when the cell value in the identified cell is known incorrect; and
    providing a logic circuit to selectively replace the table-driven output value provided by the hard-coded lookup structure with an initialized replacement value based, at least in part, on the enable repair indicator being set in the repair enable register, the initialized replacement value being saved to a repair register with initialization of the initializable hardware repair circuit.

* * * * *